US012132288B2

(12) United States Patent
Weaver et al.

(10) Patent No.: US 12,132,288 B2
(45) Date of Patent: Oct. 29, 2024

(54) WIRE TAP CONNECTOR WITH INSULTATION DISPLACEMENT CONTACT

(71) Applicant: TE Connectivity Solutions GmbH, Schaffhausen (CH)

(72) Inventors: Brian Keith Weaver, Middletown, PA (US); William James Moyer, II, Selinsgrove, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 143 days.

(21) Appl. No.: 17/937,800

(22) Filed: Oct. 4, 2022

(65) Prior Publication Data

US 2024/0113452 A1 Apr. 4, 2024

(51) Int. Cl.
*H01R 4/2454* (2018.01)

(52) U.S. Cl.
CPC .................................. *H01R 4/2454* (2013.01)

(58) Field of Classification Search
CPC .................................................... H01R 4/2454
See application file for complete search history.

(56) References Cited

U.S. PATENT DOCUMENTS 4,759,723 A * 7/1988 Siemon ................ H01R 4/2433 439/459

FOREIGN PATENT DOCUMENTS

JP S62500621 A * 3/1987

* cited by examiner

*Primary Examiner* — Jean F Duverne

(57) ABSTRACT

An electrical connector which can be used to field terminate a cable. The electrical connector includes a housing having a base member and a cover member. An electrical terminal is positioned in a terminal receiving cavity of the housing. The electrical terminal includes an insulation displacement portion and a quick disconnect portion. The insulation displacement portion has insulation displacement slots provide at a first end of the terminal. The quick disconnect portion is positioned at a second end of the terminal.

18 Claims, 4 Drawing Sheets

WIRE TAP CONNECTOR WITH INSULATION DISPLACEMENT CONTACT

FIELD OF THE INVENTION

The present invention is directed to a terminal and a wire tap connector. In particular, the invention is directed to a terminal for use in a wire tap connector which has an insulation displacement termination at one end and a quick-connect termination at the opposite end.

BACKGROUND OF THE INVENTION

There are various wire tap connectors on the market. Many of these connectors us only insulation displacement connections to connect the wires together. These types of connectors are often difficult to ensure that a positive electrical connection is effected, particularly when applied in the field. In other types of wire tap connectors, the electrical connection is made through a limited amount of contact points or surfaces, rendering these type of connections problematic, particularly in environments in which conditions may change.

It would, therefore, be beneficial to provide a connector which can be field terminated and provide an effective and stable electrical connection. In particular, it would be beneficial to provide an electrical connector with an electrical terminal which has an insulation displacement portion at one end and a disconnect portion at the other end to facilitate the termination.

SUMMARY OF THE INVENTION

An embodiment is directed to an electrical connector which can be used to field terminate a cable. The electrical connector includes a housing having a base member and a cover member. An electrical terminal is positioned in a terminal receiving cavity of the housing. The electrical terminal includes an insulation displacement portion and a quick disconnect portion. The insulation displacement portion has insulation displacement slots provide at a first end of the terminal. The quick disconnect portion is positioned at a second end of the terminal.

The housing may include a terminal mating portion, a wire receiving portion and a transition portion, the insulation displacement portion of the terminal is positioned in the wire receiving portion and the quick disconnect portion is positioned in the terminal mating portion. The wire receiving portion has wire receiving slots provided in sidewalls, the wire receiving slots positioned in line with the insulation displacement slots of the terminal.

In various embodiments a longitudinal axis of the insulation displacement slot extends in a direction which is perpendicular to a longitudinal axis of the quick disconnect portion. Cover retention arms are positioned on the side walls proximate the wire receiving slots, the cover retention arms have lead in surfaces and latching shoulders provide at free ends thereof. The cover retention arms are configured to elastically deform when the cover member is moved to a closed position.

In various embodiments the cover has a first wall and a second wall which extends essentially perpendicular to the first wall. A hinge is provided on the first wall and extends from the first wall in a direction away from the second wall. Wire positioning projections extend from the first wall of the cover member, the wire positioning projections are positioned in line with the wire receiving openings in the side walls. The wire positioning projections have curved surfaces provided at the free end thereof. Latching surfaces are provided on the first wall of the cover, the latching surfaces are positioned between the wire positioning projections and the second wall.

In various embodiments the quick disconnect portion has a generally planar portion with curved resilient contact portions extending from either side thereof. The curved resilient contact portions have arcuate sections which extend from the planar portion and tab engaging sections which extend from free ends of the arcuate sections. The first planar portion of the has a resilient contact arm formed thereon.

In various embodiments the cover member has a first wall and a second wall which extends essentially perpendicular to the first wall, a hinge is provide on the first wall and extends from the first wall in a direction away from the second wall. A wire positioning recess is provided on the first wall, the wire positioning recess is dimensioned to receive and support a wire therein. A wire positioning opening is provided the second wall, the wire positioning opening is provided in line with the wire positioning recess and is dimensioned to receive and support the wire therein. The insulation displacement slots of the terminal extend in a direction which is in line with a longitudinal axis of the quick disconnect portion of the terminal.

An embodiment is directed to an electrical connector having a housing and an electrical terminal provided in the housing. The electrical terminal is configured to terminate a first conductor with a first gauge or a second conductor with a second gauge, the second gauge being larger than the first gauge. A first strain relief section is provided on the housing, the first strain relief section configured to engage insulation of the first conductor when the first conductor is terminated to the electrical terminal. A second strain relief section is provided on the housing, the second strain relief section configured to engage insulation of the second conductor when the second conductor is terminated to the electrical terminal.

An embodiment is directed to an electrical connector having a housing and a plurality of electrical terminals provided in the housing. The electrical terminals are configured to terminate a first cable with a first gauge conductors or a second cable with second gauge conductors, the second gauge conductors being larger than the first gauge conductors. The electrical terminals include insulation displacement portions, disconnect portions and transition portions. The insulation displacement portions have insulation displacement slots provide at first ends of the terminals. The disconnect portions are provided at second ends of the terminals. The transition portions extend between the insulation displacement portions and the disconnect portions. First strain relief sections are provided on the housing, the first strain relief sections are configured to engage insulation of the first conductor when the first conductor is terminated to the electrical terminals. Second strain relief sections are provided on the housing, the second strain relief sections are configured to engage an outer shell of the second conductor when the second conductor is terminated to the electrical terminals.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
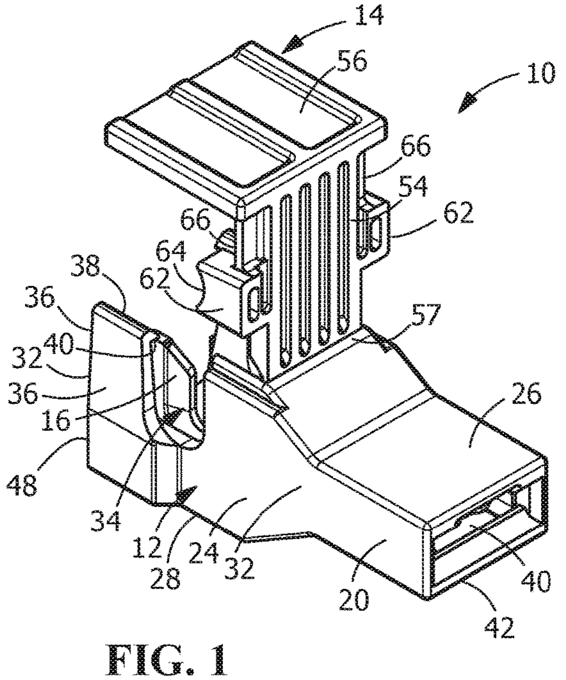
FIG. 1 is a top, front perspective view an illustrative electrical connector of the present invention shown in an open position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Referring to FIG. 1 an illustrative electrical connector 10 is shown. The connector 10 has a base member 12 and a cover member 14. In the illustrative embodiment shown, the cover member 14 is hingedly attached to the base member 12, however, the cover member 14 may also be a separate piece. An electrical terminal 16 is provided in the base member 12. The base member 12 and the cover member 14 together form the housing 18 of the electrical connector 10.

The housing 18 has a terminal mating portion 20 and a wire receiving portion 22. A transition portion 24 extends between the terminal mating portion 20 and the wire receiving portion 22. In the illustrative embodiment shown, the height of the terminal mating portion 20 is less than the height of the wire receiving portion. However, other configurations of the housing 18 may be used.

Figure 2:
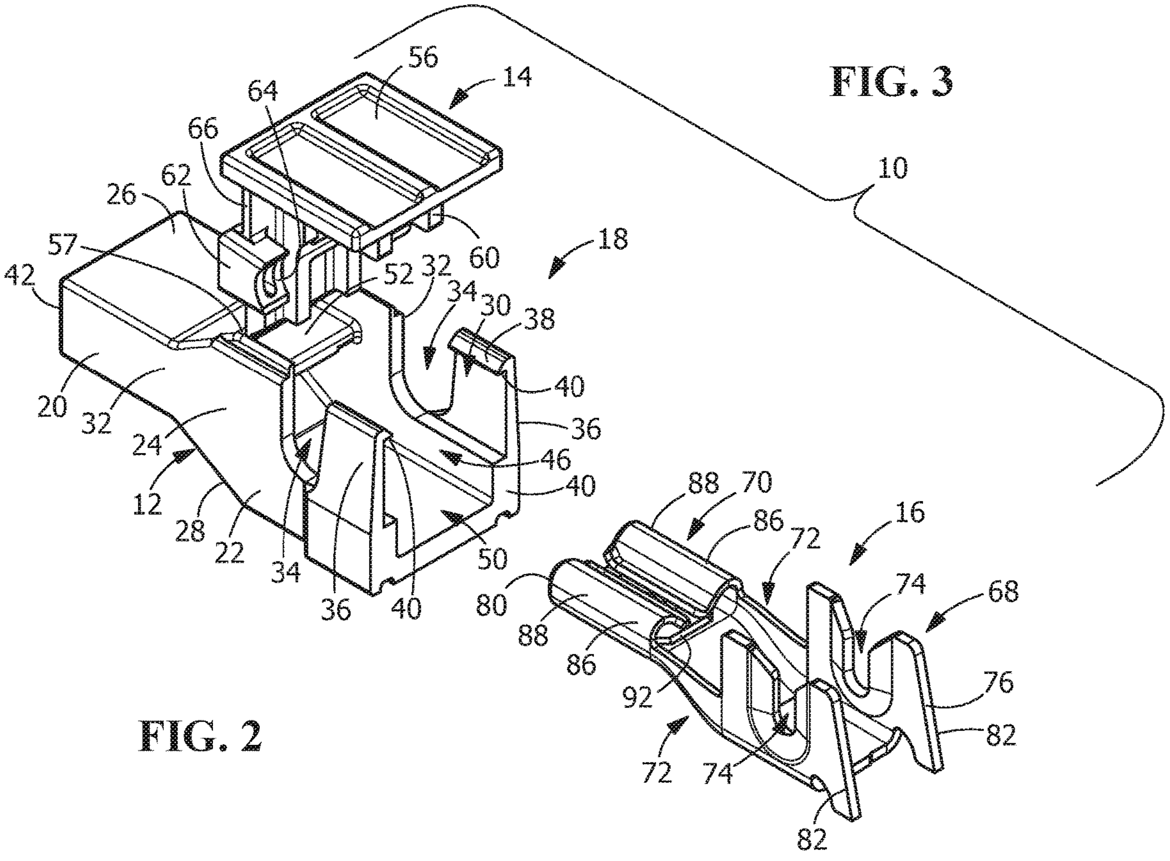
FIG. 2 is a top, back perspective view the electrical connector of FIG. 1 shown in an open position with the terminal removed.

As shown in FIGS. 1 and 2, the base member 12 has a top or first wall 26 and an oppositely facing bottom or second wall 28. The second wall 28 is a solid wall and extends across the terminal mating portion 20, the transition portion 24 and the wire receiving portion. The first wall 26 extends across the terminal mating portion 20 and the transition portion 24. A cover receiving opening 30 is provided in the first wall 26 in the wire receiving portion 22.

Side walls 32 extend between the first wall 26 and the second wall 28. Wire receiving openings or slots 34 are provided in the side walls 32 in the wire receiving portion 22 of the housing 18. In the embodiment shown, the wire receiving openings 34 have a generally U-shaped configuration.

Cover retention arms 36 are positioned on the side walls 32 proximate the wire receiving openings 34. The cover retention arms 36 have lead in surfaces 38 and latching shoulders 40 provide at the free ends thereof. The cover retention arms 36 are configured to elastically deform when the cover member 14 is moved to the closed position, as will be more fully described.

As shown in FIG. 1, the housing 18 has a front or mating face 42. The mating face 42 has a mating terminal receiving opening 44 which extends through the mating face 42 into a terminal receiving cavity 46 of the housing 18.

As shown in FIG. 2, the housing has a back face 48 which has a terminal receiving opening 50. The terminal receiving opening 50 extends through the back face 48 into the terminal receiving cavity 46. The terminal receiving opening 50 is dimensioned to allow the terminal 16 to be inserted into the terminal receiving cavity 46.

As shown in FIGS. 1 and 2, a cover support member 52 is provided in the transition portion 24 of the housing 18. The cover support member 52 extends between the side walls 32 and is recessed into the terminal receiving cavity 46 from the first wall 26.

Figure 3:
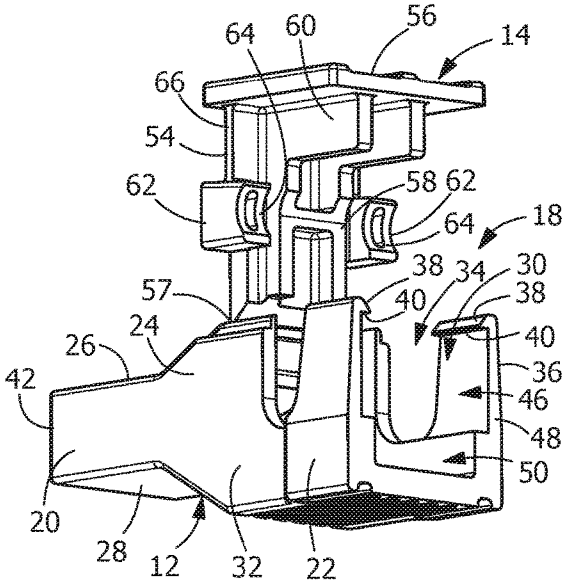
FIG. 3 is a back perspective view of the terminal of the electrical connector of FIG. 1.

As shown in FIG. 3, the cover member 14 has a first wall 54 and a second wall 56 which extends essentially perpendicular to the first wall 54. A hinge 57 is provide on the first wall 54 and extends from the first wall 54 in a direction away from the second wall 54. In the embodiment shown, the hinge 57 is a living hinge, but other configurations may be used.

Support and wire positioning ribs 58 are provided on the first wall 54. The support and wire positioning ribs 58 provide strength to the first wall 54 and cooperate with a wire positioned in the terminal 16, as will be more fully described. Positioning and support ribs 60 are provided the second wall 56. The positioning and support ribs 60 provide strength to the second wall 56 and facilitate the positioning of the terminal 16, as will be more fully described.

Wire positioning projections 62 extend from the first wall 54 of the cover member 14. The wire positioning projections 62 are positioned in line with the wire receiving openings 34 in the side walls 32 of the base member 12. The wire positioning projections 62 have curved or arcuate surfaces 64 provided at the free end thereof.

Latching surfaces 66 are provided on the first wall 54. The latching surfaces 66 are positioned between the wire positioning projections 62 and the second wall 54.

Figure 4:
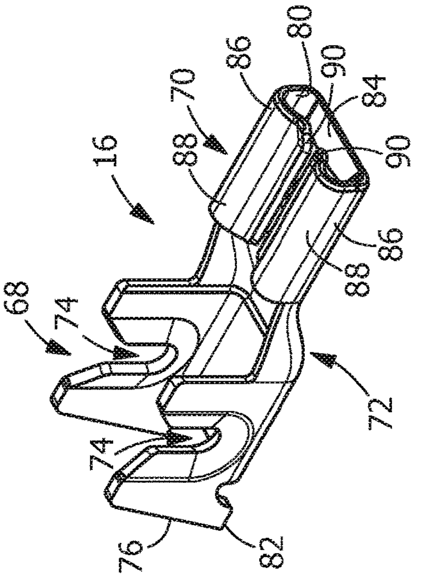
FIG. 4 is a front perspective view of the terminal of FIG. 2.

As shown in FIGS. 2 and 4, the terminal 16 is provided in the terminal receiving cavity 46. The terminal 16 has an insulation displacement portion 68, a quick disconnect portion 70 and a transition portion 72. The insulation displacement portion 68 of the terminal 16 has insulation displacement slots 74 provide at a first end 76 of the terminal 16. The quick disconnect portion 70 is provided at a second end 80 of the terminal 16. However, other configurations of the quick disconnect portion 70, such as, but not limited to, a tab may be used.

In the illustrative embodiment shown, the insulation displacement slots 74 are configured to receive conductors of different diameters or gauges therein. Longitudinal axes of the insulation displacement slots 74 of the terminal 16 extend in a direction which is perpendicular to a longitudinal axis of the quick disconnect portion 70 of the terminal 16. Positioning projections 82 of the terminal 16 extend from sides of the insulation displacement portion 68 and are provided proximate the insulation displacement slots 74.

In the illustrative embodiment shown, the quick disconnect portion 70 has a generally planar portion 84 with curved resilient contact portions 86 extending from either side thereof. The curved resilient contact portions 86 have arcuate sections 88 which extend from the planar portion 84 and tab engaging sections 90 which extend from free ends of the arcuate sections 88.

The first planar portion 84 of the has a resilient contact arm 92 formed thereon. The resilient contact arm 92 has a free end which extends toward the tab engaging sections 90. A projection (not shown) may be formed in the resilient contact arm 92. The projection extends in a direction toward the tab engaging sections 90.

The terminal 16 is positioned in the terminal receiving cavity 46 of the base member 12 of the connector 10. In this position, the insulation displacement portion 68 of the terminal 16 is positioned in the wire receiving portion 22 of the base member 12, the quick disconnect portion 70 is positioned in the terminal mating portion 20, and the transition portion 72 is positioned in the transition portion 24.

With the insulation displacement portion 68 properly positioned in the wire receiving portion 22, the insulation displacement slots 74 of the terminal 16 are aligned with the wire receiving slots 34 of the housing 18. The positioning projections 82 cooperate with the side walls 32 and the back face 48 to properly position and maintain the terminal 16 in the terminal receiving cavity 46.

Figure 5:
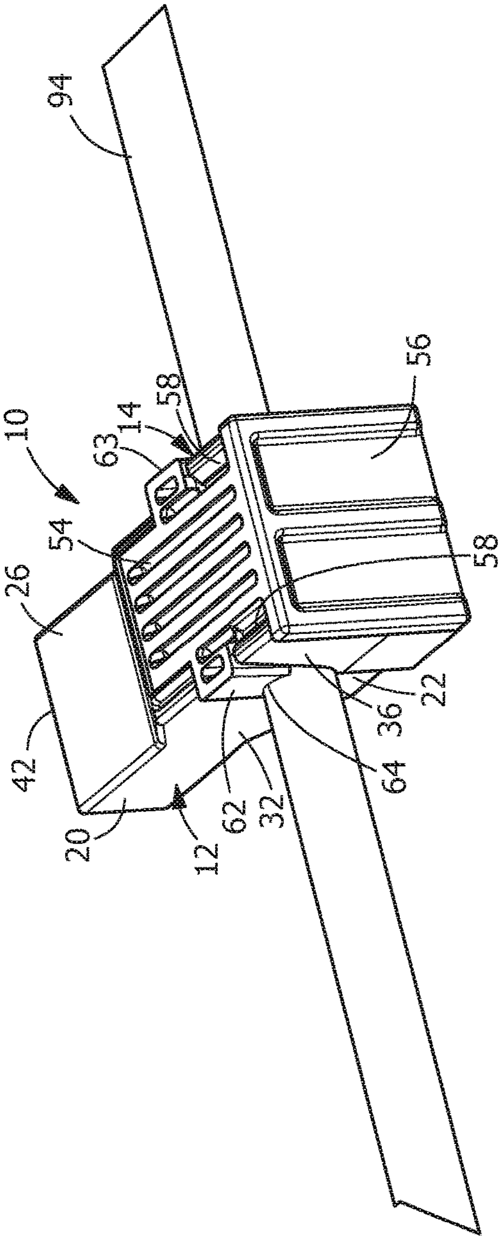
FIG. 5 is the electrical connector of FIG. 1 terminated to a wire.

With the terminal 16 properly positioned in the terminal receiving cavity 46, the connector 10 is moved into alignment with a wire 94 (FIG. 5). With the cover member 14 in the open position, the wire 94 is positioned in line with the wire receiving portion 22 of the housing 18. The connector 10 is moved relative to the wire 94 to position the wire in line with the insulation displacement slots 74 of the terminal 16 and the wire receiving slots 34 of the housing 18.

With the wire 94 properly positioned in line with the insulation displacement slots 74 of the terminal 16 and the wire receiving slots 34 of the housing 18, the cover member 14 is pivoted, rotated or moved about the hinge 57 from the first or open position, shown in FIGS. 1-3, to the second or closed position, shown in FIG. 5. At this occurs, the curved or arcuate surfaces 64 of the wire positioning projections 62 of the cover member 14 are moved into alignment with the wire 94 and the wire receiving slots 34 of the housing 18. Continued rotation causes the curved or arcuate surfaces 64 of the wire positioning projections 62 to move or force the wire 94 into the wire receiving slots 34 and the insulation displacement slots 74 of the terminal 16. The movement of the wire 94 into the insulation displacement slots 74 of the terminal 16 causes the insulation displacement slots 74 to engage and pierce the insulation of the wire 94.

As the rotation of the cover member 14 occurs, portions of the support and wire positioning ribs 58 also engage the wire 94 along the length of the wire 94 between the insulation displacement slots 74. As the wire 94 is engaged by the curved or arcuate surfaces 64 of the wire positioning projections 62 and the support and wire positioning ribs 58, the force is applied across the length of the wire positioned in the wire receiving portion 22, thereby facilitating the proper positioning of the wire 94 as the insulation of the wire 94 is pierced.

As the cover member 14 approaches the closed position, the first wall 54 of the cover member 14 engages the lead in surfaces 38 of the cover retention arms 36 of the base member 12. Continued rotation causes the cover retention arms 30 to be resiliently or elastically deformed to a stressed position to allow the first wall 54 to move past the lead in surfaces 38. As the cover member 14 is moved to the closed position, the first wall 54 is moved past the lead in surfaces 38, allowing the cover retention arms 30 to return toward their unstressed position. In this position, the latching shoulders 40 of the cover retention arms 36 cooperate with the latching surfaces 66 of the first wall 54 of the cover member 14 to secure the cover member 14 in the closed position.

With the cover member 14 fully rotated on the base member 12 and retained in position, the insulation displacement portion 68 of the terminal 16 is positioned in mechanical and electrical engagement with the wire 94. The engagement of the curved or arcuate surfaces 64 of the wire positioning projections 62, the wire 94 and the bottom surface of the wire receiving slots 34 trap the wire 94 to provide a type of strain relief to prevent the movement of the connector 10 relative to the wire 94, thereby preventing damage to the electrical connection between the insulation displacement portion 68 of the terminal 16 and the wire 94.

With the wire 94 properly terminated to the insulation displacement portion 68 of the terminal 16, the quick disconnect portion 70 of the terminal 16 may be easily and quickly mated with a mating terminal (not shown). As this mating occurs, the positioning of the terminal 16 in the terminal receiving cavity 46 prevents the unwanted movement of the terminal 16 relative to the housing 18 of the connector 10 as a mating force is applied to the quick disconnect portion 70. In particular, the positioning projections 82 engage the back face 48 of the base member 12 and the second wall 56 of the cover member 14 to prevent the movement of the terminal 16 in the direction of the mating force.

Figure 6:
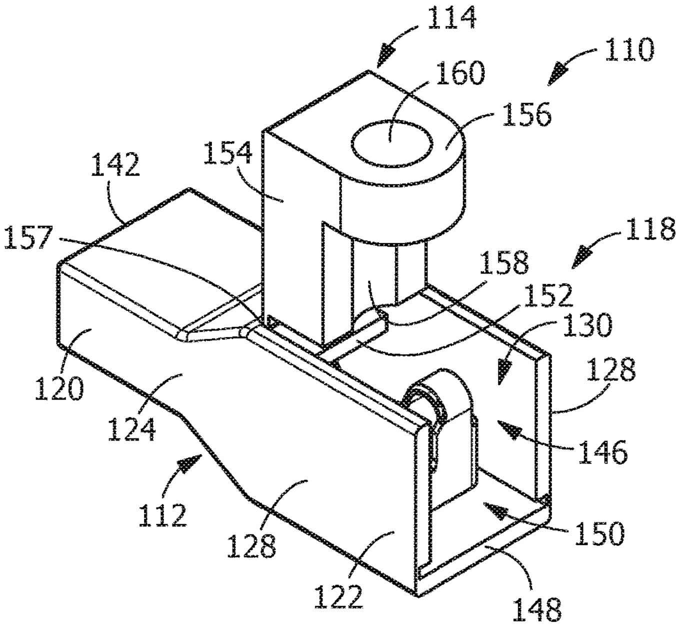
FIG. 6 is a top, back perspective view a second illustrative electrical connector of the present invention shown in an open position.
Figure 7:
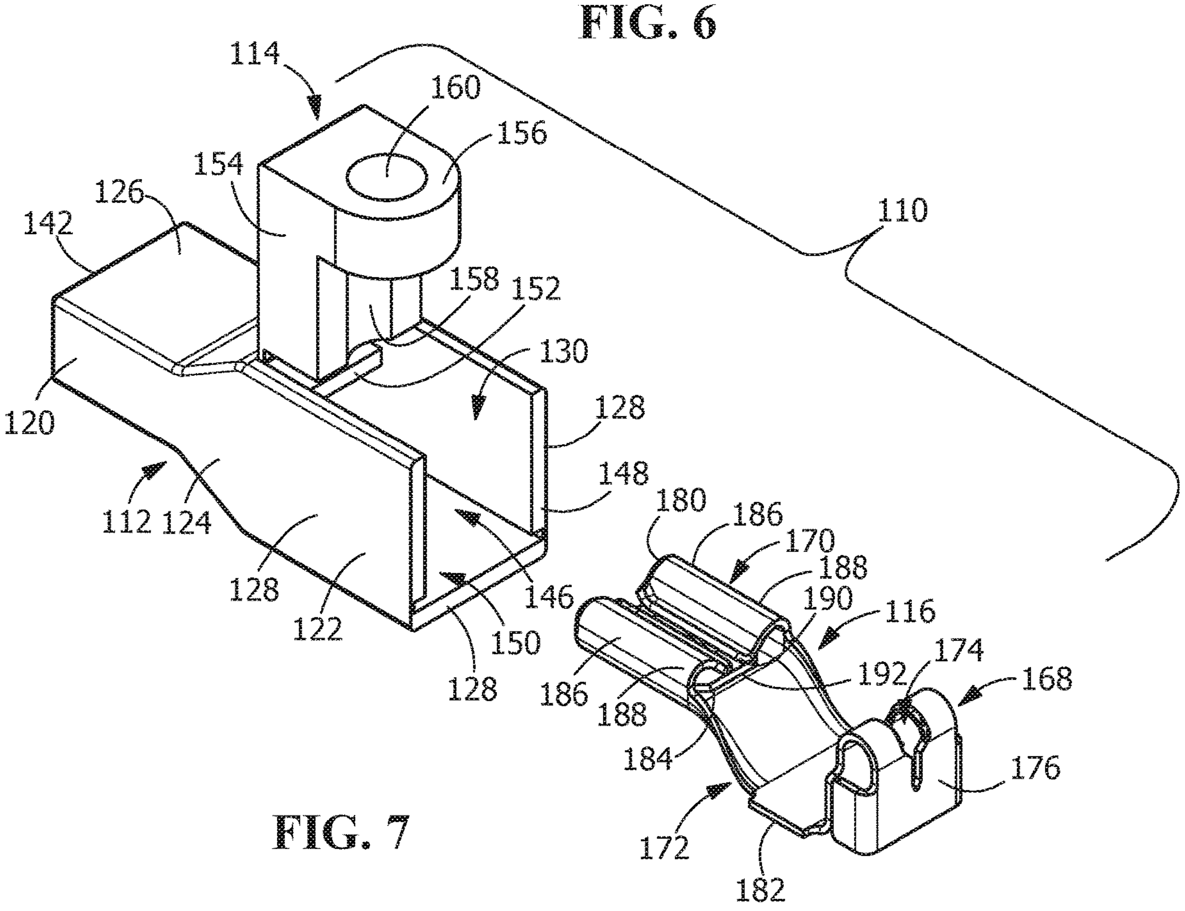
FIG. 7 is a top, back perspective view the electrical connector of FIG. 6 shown in an open position with the terminal removed.
Figure 8:
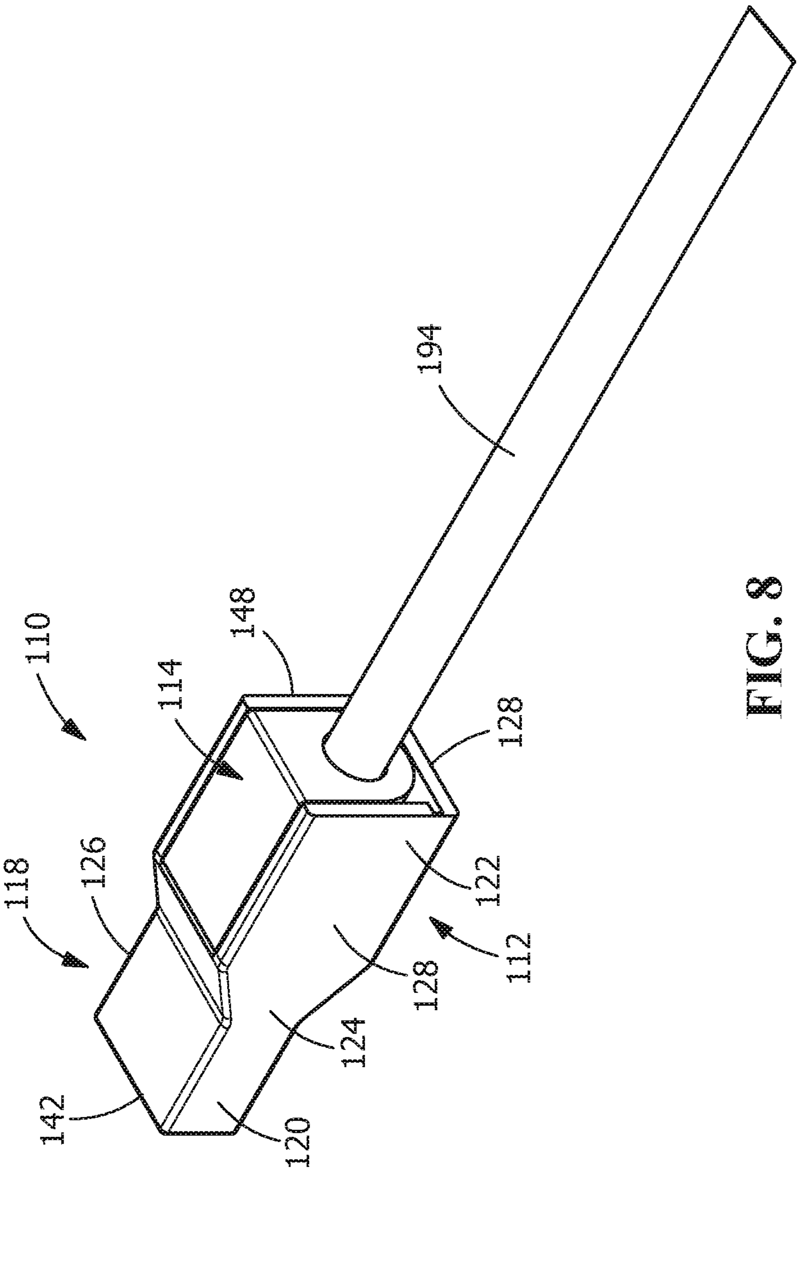
FIG. 8 is a perspective view of the connector of FIG. 6 terminated to a wire.

Referring to FIGS. 6 through 8, an alternate illustrative embodiment of the connector 110 is shown. The connector 110 has a base member 112 and a cover member 114. In the illustrative embodiment shown, the cover member 114 is hingedly attached to the base member 112, however, the cover member 114 may also be a separate piece. An electrical terminal 116 is provided in the base member 112. The base member 112 and the cover member 114 together form the housing 118 of the electrical connector 110.

The housing 118 has a terminal mating portion 120 and a wire receiving portion 122. A transition portion 124 extends between the terminal mating portion 120 and the wire receiving portion 122. In the illustrative embodiment shown, the height of the terminal mating portion 120 is less than the height of the wire receiving portion. However, other configurations of the housing 118 may be used.

The base member 112 has a top or first wall 126 and an oppositely facing bottom or second wall 128. The second wall 128 is a solid wall and extends across the terminal mating portion 120, the transition portion 124 and the wire receiving portion. The first wall 126 extends across the terminal mating portion 120 and the transition portion 124. A cover receiving opening 130 is provided in the first wall 126 in the wire receiving portion 122. Side walls 132 extend between the first wall 126 and the second wall 128.

The housing 118 has a front or mating face 142. The mating face 142 has a mating terminal receiving opening (not shown) which extends through the mating face 142 into a terminal receiving cavity 146 of the housing 118.

As shown in FIG. 2, the housing has a back face 148 which has a terminal receiving opening 150. The terminal receiving opening 150 extends through the back face 148 into the terminal receiving cavity 146. The terminal receiving opening 150 is dimensioned to allow the terminal 116 to be inserted into the terminal receiving cavity 146.

A cover support member 152 is provided in the transition portion 124 of the housing 118. The cover support member 152 extends between the side walls 132 and is recessed into the terminal receiving cavity 146 from the first wall 126.

As shown in FIGS. 6 and 7, the cover member 114 has a first wall 154 and a second wall 156 which extends essentially perpendicular to the first wall 154. A hinge 157 is provide on the first wall 154 and extends from the first wall 154 in a direction away from the second wall 154. In the embodiment shown, the hinge 157 is a living hinge, but other configurations may be used.

A wire positioning recess 158 is provided on the first wall 154. The wire positioning recess 158 is dimensioned to receive and support wire 194 therein. A wire positioning opening 160 is provided the second wall 56. The wire positioning opening 160 is provided in line with the wire positioning recess 158 and is dimensioned to receive and support the wire 194 therein.

As shown in FIG. 6, the terminal 116 is provided in the terminal receiving cavity 146. As shown in FIG. 7, the terminal 116 has an insulation displacement portion 168, a quick disconnect portion 170 and a transition portion 172. The insulation displacement portion 168 of the terminal 116 has insulation displacement slots 174 provide at a first end 176 of the terminal 116. The quick disconnect portion 170 is provided at a second end 180 of the terminal 116. However, other configurations of the quick disconnect portion 170, such as, but not limited to, a tab may be used.

In the illustrative embodiment shown, the insulation displacement slots 174 are configured to receive conductors of different diameters or gauges therein. The insulation displacement slots 174 of the terminal 116 extend in a direction which is in line with a longitudinal axis of the quick disconnect portion 170 of the terminal 116. Positioning and retention projections 182 of the terminal 116 extend from sides of the transition portion 172 and are provided proximate the insulation displacement slots 174. The positioning and retention projections 182 cooperate with the housing 118 to facilitate the proper positioning and retention of the terminal 116 in the terminal receiving cavity 146.

In the illustrative embodiment shown, the quick disconnect portion 170 has a generally planar portion 184 with curved resilient contact portions 186 extending from either side thereof. The curved resilient contact portions 186 have arcuate sections 188 which extend from the planar portion 184 and tab engaging sections 190 which extend from free ends of the arcuate sections 188.

The first planar portion 184 of the has a resilient contact arm 192 formed thereon. The resilient contact arm 190 has a free end which extends toward the tab engaging sections 190. A projection (not shown) may be formed in the resilient contact arm 192. The projection extends in a direction toward the tab engaging sections 190.

The terminal 116 is positioned in the terminal receiving cavity 146 of the base member 112 of the connector 110. In this position, the insulation displacement portion 168 of the terminal 116 is positioned in the wire receiving portion 122 of the base member 112, the quick disconnect portion 170 is positioned in the terminal mating portion 120, and the transition portion 172 is positioned in the transition portion 124.

With the insulation displacement portion 168 properly positioned in the wire receiving portion 122, the insulation displacement slots 174 of the terminal 16 are aligned with the wire positioning recess 158 and the wire positioning opening 160.

With the terminal 116 properly positioned in the terminal receiving cavity 146, the connector 110 is moved into alignment with a wire 194 (FIG. 8). With the cover member 114 in the open position, the wire 194 is moved through the wire positioning opening 160 and into wire positioning recess 158, and in line with the insulation displacement slots 174.

With the wire 94 properly positioned in line with the insulation displacement slots 174 of the terminal 116, the cover member 114 is pivoted, rotated or moved about the hinge 157 from the first or open position, shown in FIGS. 6 and 7, to the second or closed position, shown in FIG. 8. At this occurs, the wire 194, positioned and supported by the wire positioning recess 158, is forced into the insulation displacement slots 174 of the terminal 116. The movement of the wire 194 into the insulation displacement slots 174 of the terminal 116 causes the insulation displacement slots 174 to engage and pierce the insulation of the wire 194. As the wire 194 is engaged by the wire positioning recess 158, the force is applied across the length of the wire positioned in the wire receiving portion 122, thereby facilitating the proper positioning of the wire 194 as the insulation of the wire 194 is pierced.

With the cover member 114 fully rotated on the base member 112, the insulation displacement portion 168 of the terminal 116 is positioned in mechanical and electrical engagement with the wire 194. The engagement of the wire positioning opening 160, the wire positioning recess 158 and the wire 194 trap the wire 194 to provide a type of strain relief to prevent the movement of the connector 110 relative to the wire 194, thereby preventing damage to the electrical connection between the insulation displacement portion 168 of the terminal 116 and the wire 194.

With the wire 194 properly terminated to the insulation displacement portion 168 of the terminal 116, the quick disconnect portion 170 of the terminal 116 may be easily and quickly mated with a mating terminal (not shown). As this mating occurs, the positioning of the terminal 116 in the terminal receiving cavity 146 prevents the unwanted movement of the terminal 116 relative to the housing 118 of the connector 110 as a mating force is applied to the quick disconnect portion 170. In particular, the insulation displacement portion 168 engages the second wall 156 of the cover member 114 to prevent the movement of the terminal 116 in the direction of the mating force.

The electrical connector 10, 110 is configured for field terminating a wire 94, 194 so that in can be connected to a known terminal, such as, but not limited to a terminal having a tab mating interface. This connector 10, 110 can be used in the place of wire nuts when several connections need to be "daisy chained" together.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector which can be used to field terminate a cable, the electrical connector comprising:

a housing having a base member and a cover member, the base member having a wire receiving portion with wire receiving slots provided in sidewalls, cover retention arms provided on the sidewalls proximate the wire receiving slots, the cover retention arms having lead in surfaces and latching shoulders provide at free ends thereof;

an electrical terminal positioned in a terminal receiving cavity of the housing, the electrical terminal comprising:

an insulation displacement portion with insulation displacement slots provided at a first end of the terminal; and a quick disconnect portion provided at a second end of the terminal;

the wire receiving slots positioned in line with the insulation displacement slots of the terminal.

2. The electrical connector as recited in claim 1, wherein housing has a terminal mating portion, a wire receiving portion and a transition portion, the insulation displacement portion of the terminal is positioned in the wire receiving portion and the quick disconnect portion is positioned in the terminal mating portion.

3. The electrical connector as recited in claim 2, wherein a longitudinal axis of the insulation displacement slot extends in a direction which is perpendicular to a longitudinal axis of the quick disconnect portion.

4. The electrical connector as recited in claim 3, wherein the cover retention arms are configured to elastically deform when the cover member is moved to a closed position.

5. The electrical connector as recited in claim 4, wherein the cover has a first wall and a second wall which extends essentially perpendicular to the first wall.

6. The electrical connector as recited in claim 5, wherein a hinge is provided on the first wall and extends from the first wall in a direction away from the second wall.

7. The electrical connector as recited in claim 6, wherein wire positioning projections extend from the first wall of the cover member, the wire positioning projections are positioned in line with the wire receiving openings in the side walls.

8. The electrical connector as recited in claim 7, wherein the wire positioning projections have curved surfaces provided at the free end thereof.

9. The electrical connector as recited in claim 8, wherein latching surfaces are provided on the first wall of the cover, the latching surfaces are positioned between the wire positioning projections and the second wall.

10. The electrical connector as recited in claim 9, wherein positioning projections of the terminal extend from sides of the insulation displacement portion and are provided proximate the insulation displacement slots.

11. The electrical connector as recited in claim 2, wherein the quick disconnect portion has a generally planar portion with a curved resilient contact portion extending from either side thereof.

12. The electrical connector as recited in claim 11, wherein the curved resilient contact portion has an arcuate section which extends from the planar portion and a tab engaging section which extends from a free end of the arcuate section.

13. The electrical connector as recited in claim 12, wherein the first planar portion of the has a resilient contact arm formed thereon.

14. An electrical connector which can be used to field terminate a cable, the electrical connector comprising:

a housing having a base member and a cover member, the base member having;

an electrical terminal positioned in a terminal receiving cavity of the housing, the electrical terminal comprising:

an insulation displacement portion with insulation displacement slots provided at a first end of the terminal; and a quick disconnect portion provided at a second end of the terminal;

the cover member has a first wall and a second wall which extends essentially perpendicular to the first wall, a hinge is provide on the first wall and extends from the first wall in a direction away from the second wall.

15. The electrical connector as recited in claim 14, wherein a wire positioning recess is provided on the first wall, the wire positioning recess is dimensioned to receive and support a wire therein.

16. The electrical connector as recited in claim 15, wherein a wire positioning opening is provided the second wall, the wire positioning opening is provided in line with the wire positioning recess and is dimensioned to receive and support the wire therein.

17. The electrical connector as recited in claim 16, wherein the insulation displacement slots of the terminal extend in a direction which is in line with a longitudinal axis of the quick disconnect portion of the terminal.

18. The electrical connector as recited in claim 17, wherein positioning and retention projections of the terminal extend from sides of the transition portion and are provided proximate the insulation displacement slots.

* * * * *